March 16, 1937.    P. C. OSTEEN    2,073,904
TURNSTILE
Filed Nov. 21, 1935    5 Sheets-Sheet 3
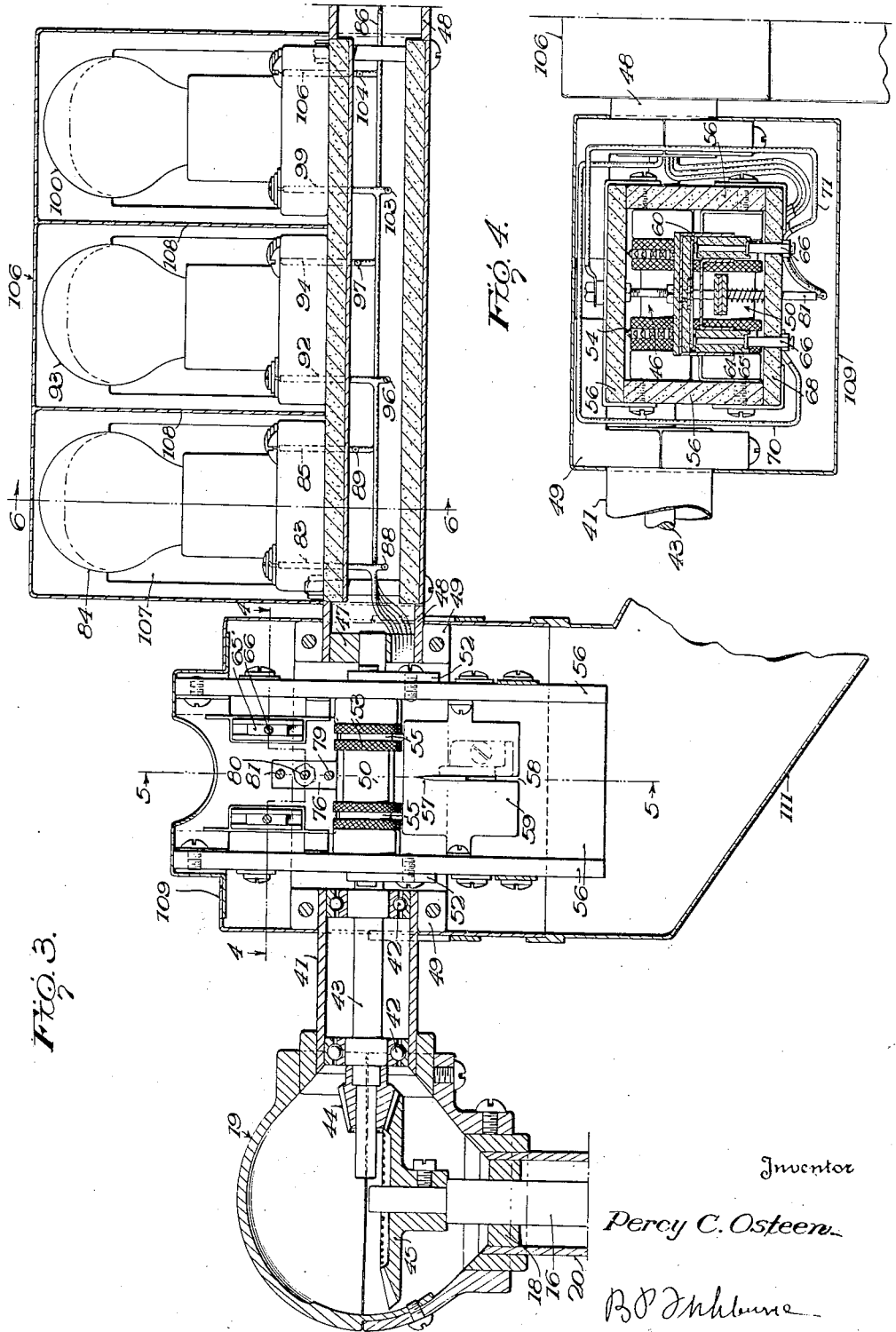
Inventor
Percy C. Osteen
BP Thhlume
Attorney March 16, 1937.  P. C. OSTEEN  2,073,904
TURNSTILE
Filed Nov. 21, 1935  5 Sheets-Sheet 4
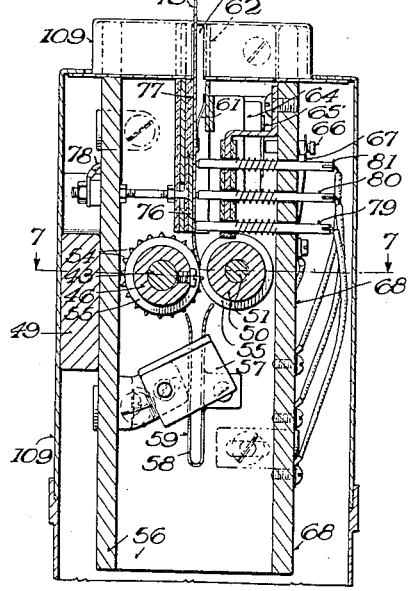
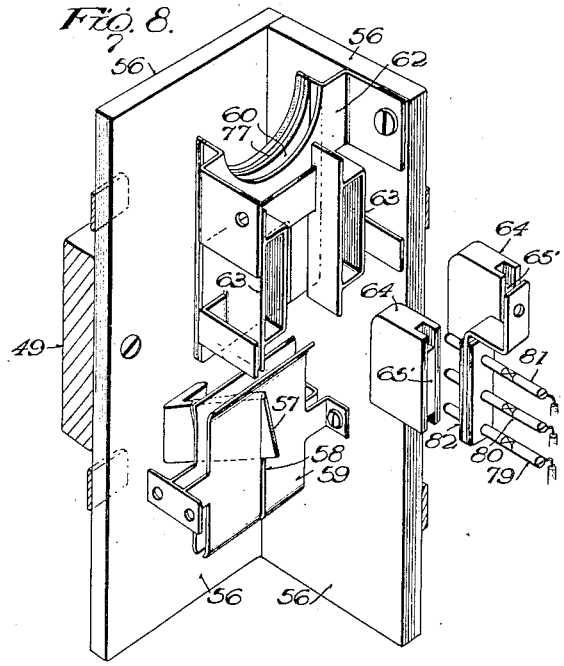
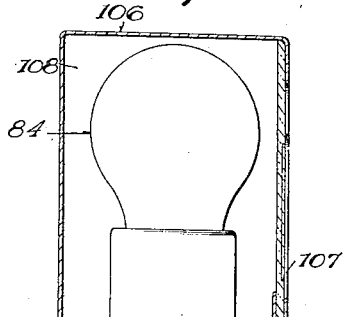
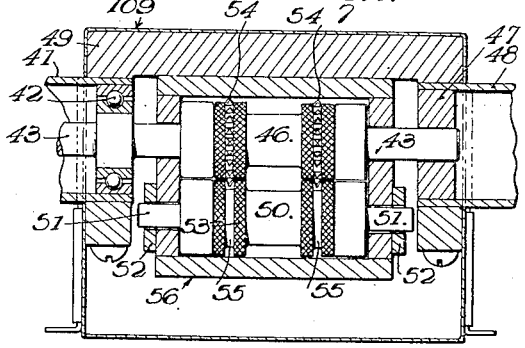
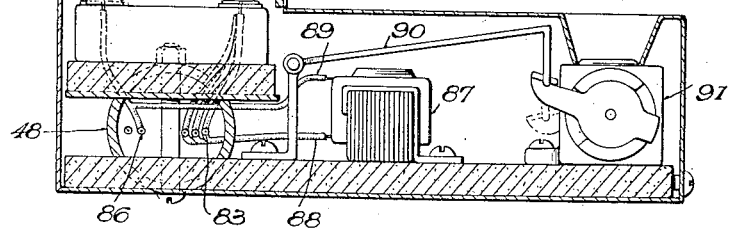
Inventor
Percy C. Osteen
By B. P. Fishburne
Attorney

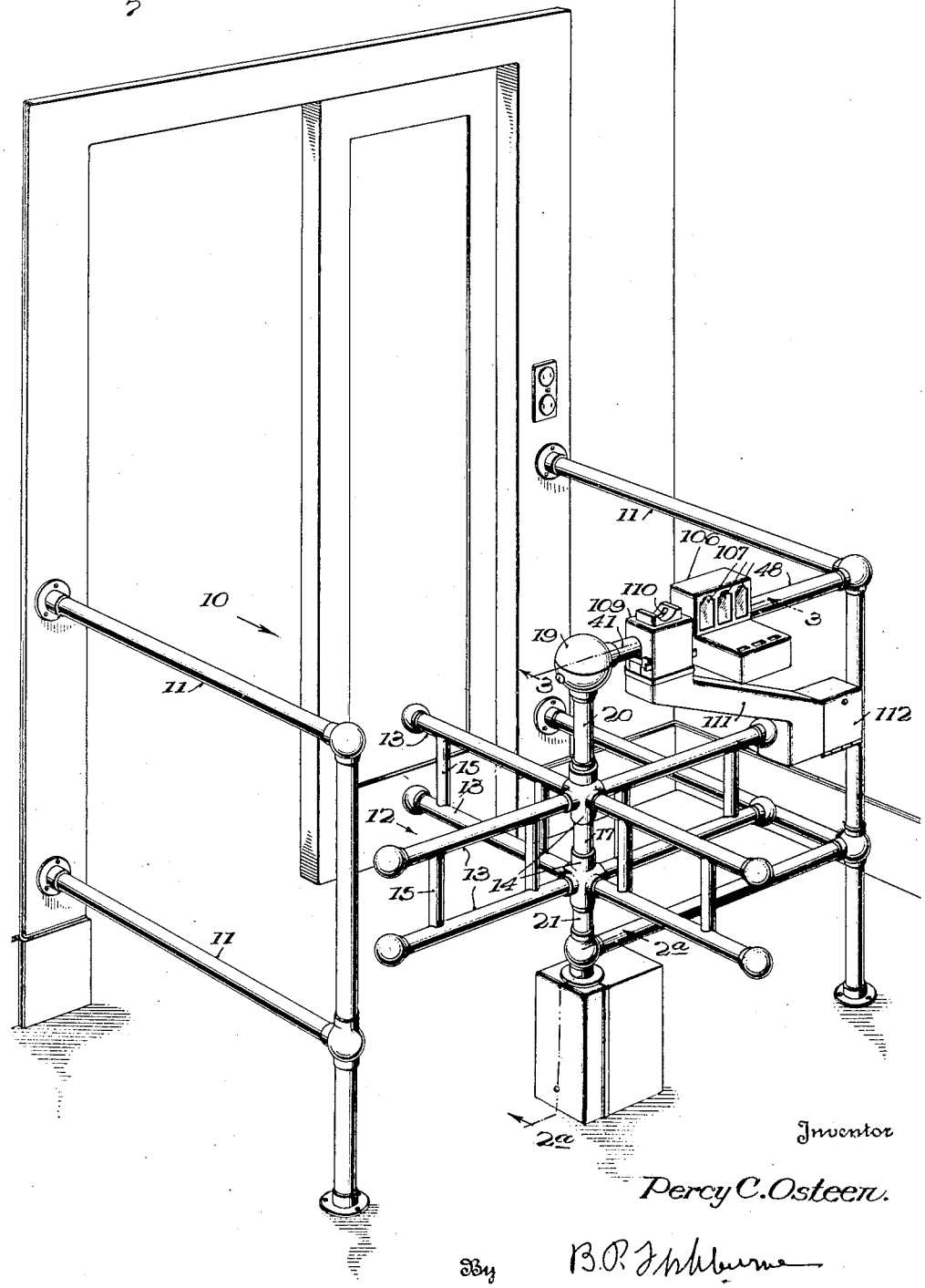

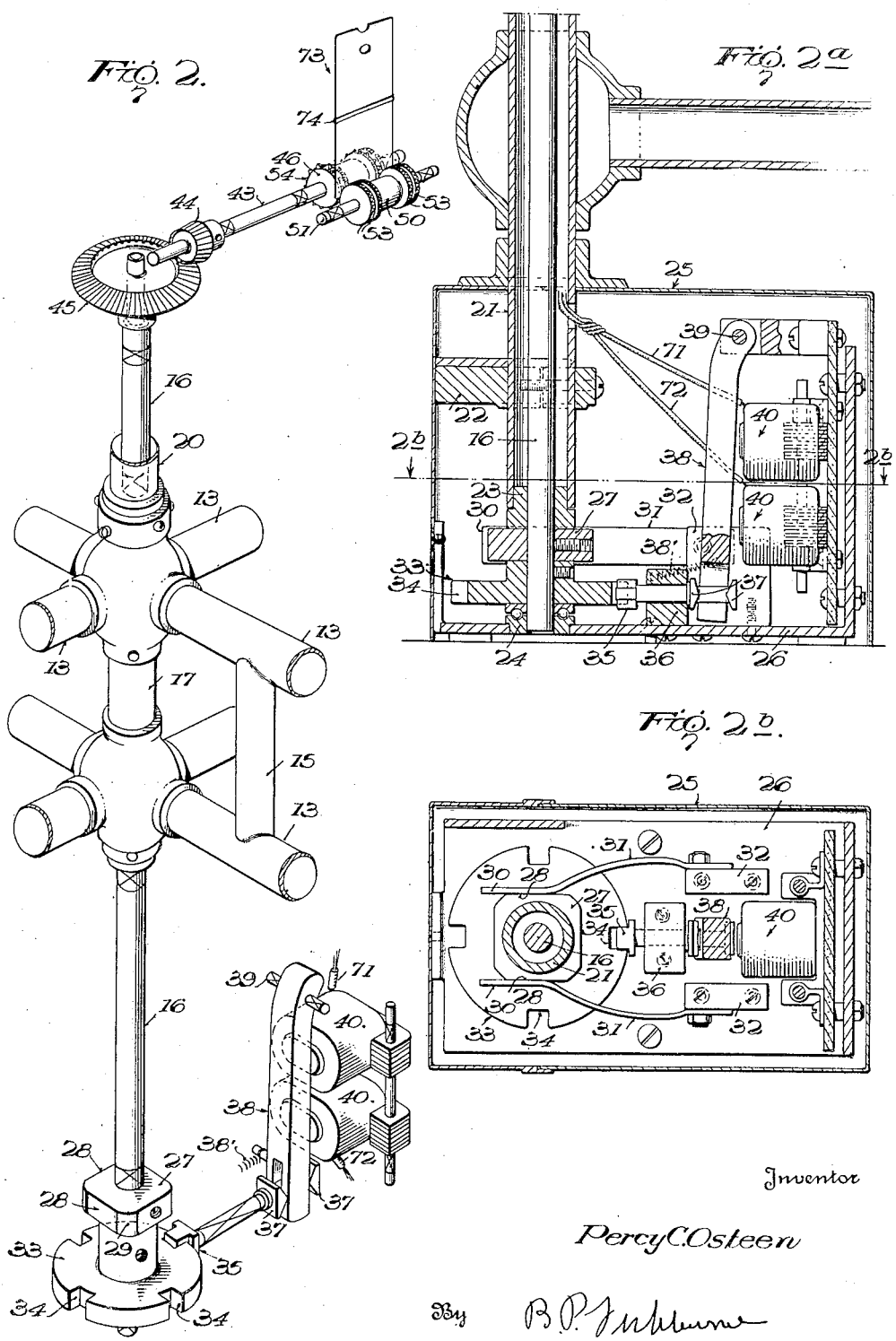

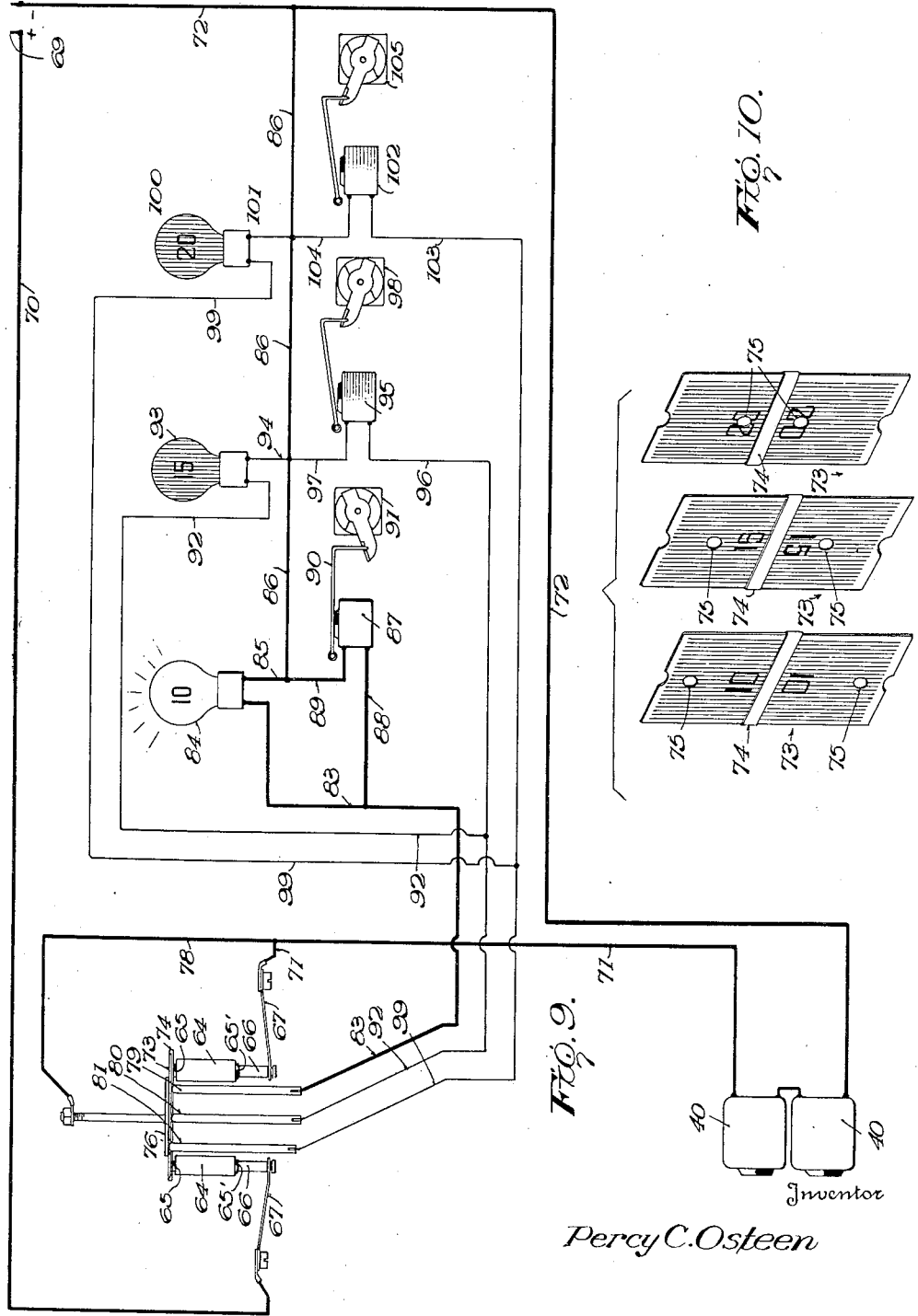

Patented Mar. 16, 1937

2,073,904

UNITED STATES PATENT OFFICE 2,073,904

TURNSTILE

Percy C. Osteen, Anderson, S. C.

Application November 21, 1935, Serial No. 50,968

17 Claims. (Cl. 194—4)

My invention relates to apparatus for controlling the movement of pedestrians, such as persons entering theaters or the like.

An important object of the invention is to provide means whereby the individual is compelled to insert a ticket or the like within a device, for releasing a barrier, so that the barrier may be passed, the movement of the barrier then serving to actuate the device for mutilating or destroying the ticket so that it cannot be reused.

A further object of the invention is to provide apparatus of the above mentioned character, wherein a signal is rendered active upon the insertion of the ticket in the device, the signal being rendered inactive when the barrier is released and moved so that the individual passes the same.

A further object of the invention is to provide a number of signals, which may differ in character and corresponding to the different denominations of the tickets used.

A further object of the invention is to provide adding mechanism in conjunction with the barrier and signal so that the total of each denomination of ticket may be readily ascertained.

Other objects and advantages of the invention will be apparent during the course of the following description.

In the accompanying drawings forming a part of this application and in which like numerals are employed to designate like parts throughout the same, Figure 1 is a perspective view of apparatus embodying my invention, Figure 2 is a similar view of the turnstile and associated elements, Figure 2a is a vertical section taken on line 2a—2a of Figure 1, Figure 2b is a horizontal section taken on line 2b—2b of Figure 2a, Figure 3 is a longitudinal vertical section taken on line 3—3 of Figure 1, Figure 4 is a horizontal section taken on line 4—4 of Figure 3, Figure 5 is a vertical section taken on line 5—5 of Figure 3, Figure 6 is a similar view taken on line 6—6 of Figure 3, Figure 7 is a horizontal section taken on line 7—7 of Figure 5, parts in elevation, Figure 8 is a perspective view of the ticket guide means and associated elements, Figure 9 is a diagrammatic view of the signals and circuits associated therewith, and, Figure 10 is a perspective view of the tickets.

In the drawings, wherein for the purpose of illustration is shown a preferred embodiment of my invention, the numeral 10 designates a passage formed by rails 11, or the like. This passage may be located upon the inner side of the lobby of a theater at the doorway.

The exit opening of the passage 10 is controlled by a turnstile 12 embodying radial upper and lower sets of arms 13, carried by hubs 14. The arms in the upper and lower sets are preferably connected by vertical spacers 15. The hubs 14 are rigidly mounted upon a vertical shaft 16, and are also rigidly connected by a sleeve 17 arranged between them. At its upper end, the vertical shaft 16 is journalled in a bearing 18, carried by a gear casing 19. A spacing sleeve 20 is rigidly attached to the gear casing 19, and extends downwardly and serves to limit the upward movement of the upper hub 14, which is rotatable with relation thereto. A lower stationary sleeve 21 is arranged near and beneath the lower hub 14 and serves to limit the downward movement of the lower hub 14. This stationary sleeve is connected in a fixed bracket 22, Figure 2a, and the lower sleeve carries, at its lower end, a sleeve bearing 23, receiving the lower portion of the vertical shaft 16, the lower extremity of which is journalled in an end-thrust bearing 24. This sleeve is arranged in a housing 25, having a base or bottom 26, and this base or bottom is rigidly attached to the floor by any suitable means.

Means are provided to shift the turnstile to the four set positions, 90° apart, comprising a cam 27, having four flat faces 28, arranged at 90° apart, with rounded shoulders 29 between them. This cam is rigidly mounted upon the lower portion of the shaft 16 and opposite faces 28 are engaged by the elongated flat end portions 30 of stiff leaf springs 31, the rear ends of which are rigidly attached to the lugs 32, in turn rigidly mounted upon the base 26.

Releasable means are provided to lock the turnstile shaft 16 against turning movement, comprising a wheel 33, rigidly secured thereto, beneath the cam 27. This wheel has notches 34, spaced 90° apart, and corresponding in arrangement with the faces 28. A sliding bolt 35 is adapted to enter each notch 34, as it is brought into the proper position, and this sliding bolt works within a stationary guide or block 36. The bolt 35 is provided near its outer end with spaced lugs 37, to receive therebetween the lower forked end of an armature-lever 38, which is pivotally supported at its upper end, as shown at 39. The armature-lever is arranged adjacent to electro-magnets 40 and when these electro-magnets are energized, the armature-lever is shifted in a direction to withdraw the free end of the bolt from within the notch 34 and the wheel 33 is therefore free to turn. A spring 38' swings armature-lever from the electro-magnets. The means for energizing the electro-magnets will be described later.

The gear housing is connected with a horizontal tube 41, holding bearings 42, within which is rotatably mounted a horizontal shaft 43. This horizontal shaft has a bevelled gear 44 rigidly mounted thereon and this bevelled gear engages a larger bevelled gear 45, in turn rigidly mounted upon the upper end of the shaft 16. The bevelled gear 45 has a diameter four times as large as the diameter of the bevelled gear 44, for a reason to be more fully explained.

The shaft 43 has a ticket engaging roller 46 mounted thereon, and this shaft 43 has its free end journalled in a bearing 47, carried in a horizontal tube 48, which is connected with the tube 41 by means of a bridge 49. Arranged opposite the ticket engaging roller 46 is a companion ticket engaging roller 50, having trunnions 51 rotatably mounted within bearing openings 52, which are slightly horizontally elongated, so that the idler roller 50 may move slightly toward and from the driving roller 43. The rollers 46 and 50 have milled annular flanges 53, which engage with the ticket and effect its downward or feeding movement. The roller 46 also has an annular set of perforating teeth 54, adapted to operate within annular grooves 55, formed in the roller 50. The function of these teeth and grooves is to mutilate the ticket so that it could not be reused.

The numeral 56 designates a housing formed of insulating material, and within this housing, and beneath the rollers, is mounted a cutter blade 57, extending through a slot 58, formed in a stationary ticket guide or tube 59, also attached to the housing 56. It is thus seen that if the ticket has passed longitudinally between the two rollers 46 and 50, it will be split longitudinally by the cutter blade 57.

Means are provided to properly conduct the ticket to a position above and in contact with the meeting surfaces of the rollers 46 and 50. This means comprises a stationary ticket guide or chute 60, vertically arranged above the rollers, and having its bore in alignment with the meeting faces of the rollers. When the ticket is inserted in this guide or chute and moved downwardly to the end of its inserting movement, its lower end will then engage with the meeting faces of the rollers, which will limit its downward movement. This chute or guide is rigidly mounted upon the housing 56.

Means are provided to prevent the ticket from being withdrawn from within the ticket chute or guide when inserted therein, and moved to the lowermost position in contact with the rollers, comprising a spring catch 61, attached to the front wall 62 of the guide or chute. The front wall 62 also has sockets 63, for slidably receiving insulating blocks 64, carrying contacts 65. The inner ends of these contacts are arranged at the bore of the ticket guide or chute, while the outer ends of the contacts are in electrical connection with plates 65', in turn engaged by spring pressed contacts 66, urged inwardly by springs 67. These springs are secured to an insulating panel 68, constituting one side of the insulating housing 56.

The numeral 69 designates a source of current, and a wire 70 is connected with the positive side of this source of current and is also connected with one spring 67, while a wire 71 is connected with the other spring 67 and has the windings of the electro-magnets 40 connected therein. One end of one winding of the electro-magnet is connected with a wire 72 which leads to the negative side of the source of current 69.

Attention is now called to Figure 10, wherein tickets 73 are shown which are used in connection with the apparatus. Each ticket is preferably formed of suitably stiff paper or cardboard or other insulating material and is provided centrally thereof with a transverse electrical conductor 74, which may be in the form of a thin copper strip, applied to one side of the ticket with its ends bent over the edges of the ticket. Instead of forming the conductor 74 of a copper strip, I contemplate forming the same of metallic paint or metallic ink, both of which contain metallic particles in sufficient amount to constitute a proper conductor. Each ticket is provided near and spaced from its opposite ends with apertures 75. The apertures of each ticket are spaced the same distance from its opposite ends as the ticket may have either end inserted in the ticket guide or chute 60. However, the apertures 75 of one ticket are spaced different distances from the ends of the ticket with respect to the apertures 75 of the other tickets, and this is done so that the apertures will have different relative longitudinal positions, for tickets of different denominations or prices.

The numeral 76 designates a contact plate which is stationary and is secured to the rear side 77 of the ticket guide or chute 60 and insulated therefrom. This contact plate has electrical connection with a wire 78, and this wire 78 is electrically connected with the wire 71. It might be stated at this point that when the ticket is in position within the ticket guide and the conductor 74 is engaging the contacts 65, that contact plate 76 will then have electrical connection with the positive pole of the source of current 69. The panel 68 carries spring pressed contact plungers 79, 80 and 81, adapted to enter apertures in the 10¢, 15¢ and 20¢ tickets, respectively. These contact plungers also slidably engage a bracket 82 and are insulated from it. The contact plungers are arranged in a row which extends longitudinally of the ticket guide or chute, and all of these contact plungers will engage the contact plate 76, in the absence of inserted tickets, but at that time, the contact plate is not connected with the positive side of the source of current.

Connected with the contact plunger 79 is a wire 83, having one terminal of an electric bulb 84 connected therewith, the other terminal of which is connected with a wire 85, connected with a wire 86, in turn connected with the wire 72. An electro-magnet 87 has one end of its winding connected with a wire 88, which is connected with the wire 83, and the opposite end of the winding is connected with a wire 89, connected with the wire 86. When the electro-magnet 87 is energized, it draws an armature 90 downwardly, and actuates a counter or adding mechanism 91. The contact plunger 80 is connected with a wire 92, connected with one terminal of an electric bulb 93, the opposite terminal of which is connected with a wire 94, connected with the wire 86. In a similar manner, an electro-magnet 95 has one end of its winding connected with a wire 96, connected with the wire 92, and the opposite end of its winding connected with a wire 97, connected with the wire 86. The electro-magnet 95 is employed to actuate a counter or adding mechanism 98, as explained in connection with the counting mechanism 91. The contact plunger 81 is connected with a wire 99, connected with one terminal of an electric bulb 100, the opposite terminal of which is connected with a wire 101, connected with the wire 86. An electro-magnet 102 has one end of its winding connected with a wire 103, connected with the wire 99, and the opposite end of its winding is connected with a wire 104 connected with the wire 86. The electro-magnet 102 is employed to actuate a counter mechanism 105, as explained in connection with the counter mechanism 91.

A housing 106 encloses the electric bulbs and this housing has windows 107, covered by translucent material, and carrying designations "10¢, 15¢, 20¢", indicating the price of the tickets. When a bulb is illuminated behind a selected window, the price of the ticket will appear upon the translucent plate. The housing is divided into separate compartments by transverse partitions 108, as shown.

The numeral 109 designates a suitable housing for the insulating housing 56 and the outer housing 109 is free from electrical connection with any of the electrical parts. This housing is provided in its top with a slot 110 to receive the ticket which passes into the ticket guiding means, and at its bottom, the housing is provided with an inclined chute 111, to receive the mutilated or cut tickets and to conduct the same to a collecting receptacle 112.

The operation of the apparatus is as follows:
As the individual enters the passageway 10 and approaches the turnstile, which is then locked against turning movement, by the bolt 35 being projected into the notch 34, such individual inserts the ticket 73 into the slot 110 and pushes the same downwardly into the ticket guide device until the lower end of the ticket engages the rollers 46 and 50. When this occurs, the metallic conductor 74 will span the spaced contacts 65 and electrically connect them, and a circuit is then closed to energize the electro-magnets 40, for retracting the bolt 35, whereby the wheel 33 is released and turnstile 12 is free to be turned in a forwardly direction. In this closed circuit, current flows from the positive pole of the source of current 69, through wire 70, contact 65, ticket conductor 74, contact 65, wire 71, electro-magnets 40, wire 72 and back to the opposite pole of the source of current. When the ticket is in position in contact with the rollers, one of the spring pressed plunger contacts 79, 80 or 81, depending upon the denomination of the ticket, has entered the aperture 75 in the ticket and will now contact with the contact plate 76, and a circuit will be closed to produce a signal corresponding to the denomination or price of the ticket. Assuming that a 10¢ ticket has been inserted into the machine, a circuit will be closed to cause the "10¢" bulb 84 to glow. In this circuit, current will flow from the positive side of the source of current 69, through wire 70, first contact 65, ticket conductor 74, second contact 65, wire 78, contact 76, plunger contact 79, wire 83, bulb 84, wire 83, and through wire 86 to wire 72 and then back to the opposite pole of the source of current. The current will divide and also flow through wire 88, electro-magnet 87, wire 89, and to wire 86. It is thus seen that the turnstile will be released, the proper signal given to indicate the denomination or price of the ticket and the counter or adding mechanism lever depressed to actuate the counting mechanism. The turnstile being free to turn forwardly, the individual moves it forwardly and the rollers 43 and 50 are rotated and grip the ticket and move it downwardly or further into the ticket guiding device. As soon as this occurs, the ticket conductor 74 breaks engagement with the contacts 65, and the electro-magnets 40 are deenergized and the spring 38' will swing the armature-lever 30 forwardly and again project the bolt so that it is brought into engagement with the wheel 33 and will automatically enter the next notch 34 when the turnstile has been moved for 90°. Upon the downward movement of the ticket, by the action of the rollers, the contact plunger 79 was withdrawn from the aperture 75 in the ticket 73 and hence its electrical contact with the plate 76 broken, and the bulb 84 will cease to glow. When the bulb ceases to glow, electro-magnet 87 is deenergized and the counter arm 90 automatically rises to the upper position. Upon the further downward movement of the ticket, due to the action of the rollers 43 and 50, such ticket is brought into engagement with the cutter blade 57 and split longitudinally in half and these halves drop into the chute 11 and pass to the receptacle 112. The turnstile continues its forward turning movement until it has travelled through 90° and is again automatically locked by the bolt 35. This movement is sufficient to allow the individual to pass the turnstile. Since the ratio between the gears 44 and 45 is four to one, the shaft 43 has made a complete revolution when the vertical shaft 16 has turned for 90°, and the cycle of operation of the apparatus is completed when the shaft 43 has turned for a complete revolution.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In apparatus for controlling the movement of pedestrians, a turnstile, means for controlling the movement of the turnstile and actuated by a ticket inserted within said means to release the turnstile for turning movement, means actuated by the turnstile when it is released and turned to further draw the ticket into the first named means, and a cutter arranged to act upon the ticket during its drawing in movement to mutilate the same.

2. In apparatus for controlling the movement of pedestrians, a turnstile having a rotatable part, a lock device to engage the rotatable part, electrical means to operate the lock device including a pair of spaced contacts, guide means arranged adjacent to the spaced contacts, paper tickets of different denominations, each ticket having an electrical conductor to engage the spaced contacts, the tickets having apertures arranged for different distances from their leading ends depending upon the denominations of the tickets, and signal means for coaction with the ticket of each denomination and including a movable contact to enter the aperture of each ticket when the electrical conductor of such ticket engages the pair of spaced contacts, and a contact for coaction with the movable contact and electrically connected with one of the said spaced contacts.

3. In apparatus for controlling the movement of pedestrians, a turnstile, a lock device for controlling the turning movement of the turnstile, electrical means to operate the lock device including a source of current and a circuit connected with the opposite poles of the source of current, a pair of spaced contacts connected in the circuit, a ticket guiding device arranged adjacent to the pair of spaced contacts, a contact member connected with one of the spaced contacts and thereby being adapted to be connected with one pole of the source of current, tickets of different denominations being adapted for insertion within the ticket guiding device and carrying an electrical conductor to engage the spaced contacts and thereby close the circuit at such contacts and to also electrically connect the contact member with one pole of the source of current, said tickets having apertures spaced different distances from their leading ends depending upon their denominations, movable spaced contacts arranged in a group near and extending longitudinally of the ticket guiding device, each movable contact being adapted to engage the contact member when passing through the corresponding aperture in the ticket and a signal device for each ticket and including a circuit connected with the corresponding movable contact and the opposite pole of the source of current, and means operated by the turnstile when it is released and turned to effect the advancing movement of the ticket so that the movable contact is withdrawn from within the aperture and the signal circuit opened.

4. In apparatus for controlling the movement of pedestrians, a turnstile, means to hold the turnstile against turning movement, electrical means to actuate the holding means for releasing the turnstile, spaced contacts connected with the electrical means, said spaced contacts being adapted to be electrically connected by a ticket carrying a conductor and having an aperture, a signal device, means to energize the signal device when the conductor of the ticket engages the spaced contacts and including a movable contact to enter the aperture in the ticket, and means operated by the turnstile after it is released and turned to advance the ticket so that the movable contact is withdrawn from the aperture and the signal device deenergized.

5. In apparatus for controlling the movement of pedestrians, a turnstile, means for regulating the turning movement of the turnstile including an electric circuit, means to close such circuit including a ticket carried conductor, a contact member having electrical connection with the ticket carried conductor when such conductor closes the circuit, the ticket having an aperture, means including a movable contact to enter the aperture and engage the contact member, and means operated by the turnstile when it is released and turned to advance the ticket and withdraw the movable contact from within the aperture.

6. In apparatus for controlling the movement of pedestrians, a turnstile, ticket guide means, electrically operated means to control the turning movement of the turnstile, circuit closing means connected with the electrically operated means and actuated by a ticket inserted within the ticket guide means, rollers in addition to the circuit closing means and arranged adjacent to the ticket guide means to engage with the ticket and advance the same, and driving connecting means between the turnstile and one roller.

7. In apparatus for controlling the movement of pedestrians, a turnstile, ticket guide means, electrically operated means to control the turning movement of the turnstile, circuit closing means connected with the electrically operated means and actuated by a ticket inserted within the ticket guide means, means in addition to the circuit closing means to advance the ticket within the ticket guide means including a roller, gearing connecting the roller and turnstile, signal means adapted to be rendered active upon the insertion of the ticket within the ticket guide means, the signal means being also adapted to be rendered inactive upon the advancement of the ticket by the roller.

8. In apparatus for controlling the movement of pedestrians, a turnstile, electrical ticket controlled means to normally hold the turnstile against turning movement and to release the same upon the insertion of a ticket therein, electrical signal means connected with the first named means and actuated when the ticket is inserted and the turnstile released, a counter mechanism electrically connected with the signal means and actuated when the signal means is rendered active, and means operated by the turnstile when it is released and turned to mutilate the ticket.

9. Apparatus for controlling the movement of pedestrians through a passageway, comprising a movable barrier shifted by the pedestrian moving through the passageway, check controlled means to normally hold the barrier against movement and adapted to release the barrier for such movement, upon the insertion of a check within such means, and means operated by the movable barrier when it is released and shifted to act upon the check to render the same unfit for reuse.

10. Apparatus for controlling the movement of pedestrians, a turnstile, means normally holding the turnstile against turning movement and adapted to be actuated to release the turnstile so that it may be turned, and check control means to actuate the first named means to cause the same to release the turnstile, including a check receiving guide, a device arranged adjacent to the guide and serving to limit the inserting movement of the check within the guide, and driving connecting means between the turnstile and the device so that the device is operated by the turnstile when the turnstile is turned, said device also serving to mutilate the check so that it cannot be reused.

11. In apparatus of the character described, a turnstile including a substantially vertical shaft, means to normally hold the turnstile against turning movement and to be actuated to release the same for turning movement, and check controlled means to actuate the first named means and including rollers to engage the check, gearing connecting one roller with the upper end of the vertical shaft, and means cooperating with the rollers to multilate the check so that it cannot be reused.

12. In apparatus of the character described, a check receiving guide, rollers arranged adjacent to the check receiving guide and serving to limit the inserting movement of the check within the guide and to support the check in the guide in the active position, means actuated by the check when supported in the guide in the active position, means to drive one roller so that the rollers cause the check to pass between them, and means cooperating with the rollers to act upon the check and render the same unfit for reuse.

13. In apparatus of the character described, a guide for receiving a flexible ticket having a conductor, an electrical circuit to be closed by the conductor when the flexible ticket reaches a selected position within the guide, a pair of rollers arranged adjacent to the guide and engaging and supporting the flexible ticket when inserted into the guide to the selected position, means to drive one of the rollers so that the rollers cause the flexible ticket to travel between them, and a blade arranged upon the outlet side of the rollers to cut the ticket when the rollers advance such ticket toward the blade.

14. In apparatus of the character described, a ticket receiving guide, rollers arranged at a selected elevation beneath the inlet of the guide for supporting tickets which are inserted within the guide, tickets for insertion within the ticket receiving guide and having apertures arranged for different distances from their leading ends, movable spaced contacts arranged in a group extending longitudinally of the guide, each movable contact entering the aperture of the corresponding ticket when such ticket is arranged at the selected elevation within the ticket receiving guide, and means to drive one roller so that the ticket is moved between the rollers and the contact removed from within the aperture.

15. In apparatus for controlling the movement of pedestrians, a turnstile, ticket guide means, electrically operated means for controlling the turning movement of the turnstile, circuit closing means connected with the electrically operated means and rendered active by the ticket when inserted in the ticket guide means, rollers arranged adjacent to the ticket guide means and serving to limit the inserting movement of the ticket, electrical signal means rendered active when the ticket is inserted within the ticket guide means and engages the rollers, and means to drive one roller from the turnstile so that the rollers advance the ticket.

16. In apparatus for controlling the movement of pedestrians, a turnstile, ticket guide means, means to control the turning movement of the turnstile and actuated by the ticket when inserted within the ticket guide means, a pair of rollers arranged near the ticket guide means to engage with the ticket and advance the same by causing the ticket to pass between the rollers, said rollers having means to mutilate the ticket, and means to drive one roller from the turnstile.

17. In apparatus for controlling the movement of pedestrians, a turnstile having a rotatable part, a locking device to engage the rotatable part, electrical means to operate the locking device including a pair of spaced contacts, guide means arranged adjacent to the spaced contacts, paper tickets for insertion within the guide means, each ticket having an electrical conductor to engage the spaced contacts, each ticket having an aperture, signal means including a movable contact to enter the aperture and a contact for coaction with said movable contact and having electrical connection with one of said spaced contacts, and means operated by the turnstile when it is released and turned to act upon the paper ticket to render the same unfit for reuse.

PERCY C. OSTEEN.